(12) United States Patent
Zhu et al.

(10) Patent No.: US 7,720,629 B2
(45) Date of Patent: May 18, 2010

(54) METHOD AND SYSTEM FOR MEASURING FLOW LAYER VELOCITIES USING CORRELATION VELOCITY MEASURING SONAR

(75) Inventors: Weiqing Zhu, Beijing (CN);
Changhong Wang, Beijing (CN)

(73) Assignee: Institute of Acoustics, Chinese Academy of Science, Beijing (CN)

( * ) Notice: Subject to any disclaimer, the term of this patent is extended or adjusted under 35 U.S.C. 154(b) by 365 days.

(21) Appl. No.: 10/549,199

(22) PCT Filed: Dec. 12, 2003

(86) PCT No.: PCT/CN03/01059

§ 371 (c)(1),
(2), (4) Date: Sep. 16, 2005

(87) PCT Pub. No.: WO2004/083890

PCT Pub. Date: Sep. 30, 2004

(65) Prior Publication Data

US 2007/0129910 A1    Jun. 7, 2007

(30) Foreign Application Priority Data

Mar. 19, 2003  (CN) .............................. 03 1 19666
Nov. 24, 2003  (CN) ........................ 2003 1 0115154

(51) Int. Cl.
*G01S 13/00* (2006.01)
*G01S 15/00* (2006.01)
*G01P 5/00* (2006.01)
*G01F 1/66* (2006.01)

(52) U.S. Cl. ....................... 702/143; 73/861.27; 367/89

(58) Field of Classification Search ................. 702/143; 73/861.27; 367/89
See application file for complete search history.

(56) References Cited

U.S. PATENT DOCUMENTS

| 4,244,026 | A | * | 1/1981 | Dickey, Jr. .................. 702/143 |
| 5,122,990 | A | * | 6/1992 | Deines et al. ............... 367/100 |
| 5,315,562 | A | | 5/1994 | Bradley et al. |
| 5,422,860 | A | | 6/1995 | Bradley et al. |
| 5,869,758 | A | * | 2/1999 | Huiberts ....................... 73/197 |
| 6,132,108 | A | * | 10/2000 | Kashiwamura et al. ........ 703/2 |

OTHER PUBLICATIONS

Zhu, Weiqing, et al., "IOA-1 Acoustic Correlation Current Profiler (ACCP)," Sep. 11-14, 2000, vol. 2, pp. 777-779.*
Zhu, Weiqing, et al., "IOA-1 Multi-Function Acoustic Doppler Current Profiler (MADCP)," Sep. 11-14, 2000, vol. 2, pp. 773-776.*

* cited by examiner

*Primary Examiner*—Eliseo Ramos Feliciano
*Assistant Examiner*—Janet L Suglo
(74) *Attorney, Agent, or Firm*—Robert E. Bushnell, Esq.

(57) ABSTRACT

The present invention discloses a method and a system for measuring flow layer velocities using correlation velocity measuring sonar. The present invention provides a new theoretical expression for fluid medium sonar array temporal and spatial correlation function, the velocities of each flow layer are derived by fitting experimental data and a theoretical function, or fitting absolute value operated and localized experimental data and a theoretical function. The fluid medium sonar array temporal and spatial correlation function of the present invention is succinctly expressed by Kummer function, and well coincided with the experiments. This function is applicable not only to far field region, i.e. planar wave region, but also Fraunhofer region, i.e. spherical wave region. The present invention has the merits of high measurement accuracy, small calculation load, good robustness and fast convergence.

12 Claims, 4 Drawing Sheets

Fig 5B

METHOD AND SYSTEM FOR MEASURING FLOW LAYER VELOCITIES USING CORRELATION VELOCITY MEASURING SONAR

TECHNICAL FIELD

The present invention is related to a method for measuring fluid medium velocities, and more concretely to a method and system for measuring flow layer velocities using correlation velocity measuring sonar.

PRIOR ART

At present, methods for measuring flow layer velocities using correlation velocity measuring sonar are summarized as follows.

(1) U.S. Pat. No. 5,315,562, titled "Correlation Sonar System" invented by S. E. Bradley et al. discloses correlation sonar used for measuring current profile and velocities of a vessel in water relative to the bottom. This invention includes the following four aspects:

(A) A complex signal is transmitted. The complex signal's autocorrelation function has two different peaks at delay $\tau=0$ and $\tau=\tau_c$. The previous technology of transmitting two pulses that may cause interferences between medium layers of the fluid is eliminated.

(B) A theoretical expression for sonar array temporal and spatial correlation function for fluid medium and bottom medium is introduced in series forms, wherein bessel function and. Legendary function are included, and a simplified expression based on experiences is proposed and adopted for signal processing because of its simplicity (C) Based on the maximum likelihood principle, by using the simplex method, the current velocities and the vessel's velocity relative to the bottom are derived by optimally fitting the theoretical and experimental sonar array time-spatial correlation functions.

(D) A matched filter approach is used for detecting the seabed echoes.

(2) U.S. Pat. No. 5,422,860, titled "Correlation Sonar System" invented by S. E. Bradley et al. discloses a method to generate correlation sonar signals. Pseudo random phase-coded signal, whose autocorrelation function has two different peaks at delay $\tau=0$ and $\tau=\tau_c$, is transmitted.

The methods for measuring current velocities has obvious shortcomings: (1) The theoretical expression for sonar array temporal and spatial correlation function is so complex that it is difficult to use in practice; but the simplified expression derived from experience does not have sufficient physical foundation. This is the most important technology of correlation velocity-measuring sonar system. (2) It is not the best method to fit the theoretical and experimental temporal and spatial correlation function by using simplex method based on the maximum likelihood principle. (3) It is also not the best method to use a velocity corresponding to the maximum value of the sonar array temporal and spatial correlation function as an initial value of velocity estimation.

SUMMARY OF THE INVENTION

The main objective of the invention is to provide a preferred theoretical fluid medium sonar array temporal and spatial correlation function for fitting with experimental data. Another objective of the invention is to improve the data processing method for data temporal and spatial correlation function.

In order to achieve the objectives mentioned above, the present invention provides a method for measuring flow layer velocities using correlation velocity measuring sonar, the method comprising steps of (1) Select transmit code for acoustic pulses, whose auto-correlation has a peak at a non-zero time delay;

(2) According to the transmit code, transmit acoustic pulses into fluid medium, and receive echo signals backscattered by flow layers;

(3) Demodulate and filter the echo signals of flow layer, and calculate a data temporal and spatial correlation function matrix of flow layer;

(4) extract a data matrix for fitting from the data temporal and spatial correlation function matrix of flow layer derived from the step (3), wherein the data matrix for fitting is the data temporal and spatial correlation function matrix of flow layer, or is a localized data temporal and spatial correlation function matrix of flow layer, and the localized data temporal and spatial correlation function matrix of flow layer is derived from steps of (a) operate absolute value of the data temporal and spatial correlation function matrix of flow layer to attain a data temporal and spatial correlation function absolute value matrix of flow layer, and elements of said data temporal and spatial correlation function absolute value matrix have a maximum value $E_{Max}$;

(b) set a threshold value X, wherein $0<_X \leq 1$, preferably $0.7<_X<1$, those elements in the absolute value matrix with numerical value less than $_X E_{Max}$ is set to zero, those elements with numerical value equal to or larger than $_X E_{Max}$ is retained, and the localized temporal and spatial correlation function absolute value matrix of the flow layer can be derived by operating all the elements;

(5) set a search range for the unknown parameter ensemble $\vartheta = \{\overline{V}_x, \overline{V}_y, \sigma_{vx}, \sigma_{vy}, \gamma\}$, wherein $\overline{V}_x, \overline{V}_y$ are average values of relative velocities of flow layer in x, y directions respectively, $\sigma_{vx}, \sigma_{vy}$ are standard deviation of velocities in x, y directions respectively, $\gamma$ is width factor;

(6) fit the data matrix derived from the step (4) with a theoretical function in the search range of the unknown parameter ensemble $\vartheta$; the fitting algorithm uses a sequential quadratic programming method based on the maximum likelihood principle or on the nonlinear least square principle;

The theoretical function is $$\varphi(\tau, \vartheta, d) = C\left\{\exp(\gamma\beta_\theta) - \frac{\xi_2}{2}\left[\frac{\theta_e^2}{2\pi}{}_1F1(2; 1; \beta_\theta) - \cos 2(\alpha_3 - \alpha_2)\frac{B_2^2\theta_e^4}{8\pi^2}{}_1F_1(3; 3; \beta_\theta)\right]\right\}$$

where C is a constant, $\tau$ is time delay, d is the distance between receive elements of the sonar array, $_1F_1(*)$ is Kummer function, $$\beta_\theta = -\beta_2^2 \theta_e / 4\pi,$$

$$\beta_2 = \frac{\omega_0}{c}\left((\tau\overline{V}_x + d_x)^2 + (\tau\overline{V}_y + d_y)^2\right)^{1/2}, \xi_2 = \frac{\omega_0\tau}{c}(\sigma_{vx}^2 + \theta_{vy}^2)^{1/2},$$

$$\alpha_2 = tg^{-1}\frac{\tau\overline{V}_y + d_y}{\tau V_x + d_x}, \alpha_3 = tg^{-1}\frac{\sigma_{vy}}{\sigma_{yx}}, \theta_e^2 = \frac{1}{2}\frac{\theta_b^2\theta_c^2}{\theta_b^2 + \theta_c^2};$$

where $\omega_0$ is the central frequency of the transmit signal, c is the velocity of sound, dx and dy are component of d in x and y direction respectively, and $\theta_b$ and $\theta_c$ are transmit beam width and receive beam width respectively;

(7) Cooperate the vessel's velocity relative to the bottom with average values of the relative velocities $\{\overline{V}_x, \overline{V}_y\}$ obtained from the step (6) to calculate the absolute velocities of flow layer.

The steps (1)~(7) can be repeated for the next measurement of flow layer velocities. When repeating the step (5), a previous measured relative velocity or an average value of multiple previous measured relative velocities is used as the initial value of the search range of the unknown parameter ensemble $\vartheta$.

The present invention further provides a correlation velocity measuring sonar system including a sonar array (200) and an electronic subsystem, the electronic subsystem includes a computer (406), characterized in that the computer (406) comprises:

An initialization module for initializing software and hardware;

A signal coding module for selecting transmit code for acoustic pulse, whose autocorrelation has a peak value at a non-zero time delay;

a transmit/receive module for transmitting acoustic pulses into fluid medium, and receiving echo signals backscattered by flow layers;

A demodulation and filter module for demodulating and filtering the echo signals of flow layer received by the transmit/receive module;

A matrix calculation module for calculating data temporal and spatial correlation function matrix of flow layer according to the demodulated and filtered echo signals of the flow layer;

a matrix extraction module for extracting a data matrix for fitting from the data temporal and spatial correlation function matrix of flow layer derived from the matrix calculation module, wherein the data matrix for fitting from the matrix extraction module can be the data temporal and spatial correlation function matrix of flow layer, or a localized data temporal and spatial correlation function absolute value matrix of flow layer; when the localized data temporal and spatial correlation function absolute value matrix of flow layer is used as the data matrix for fitting, the matrix extraction module comprises:

an absolute value calculation unit for performing an absolute value operation on the data temporal and spatial correlation function matrix to attain a data temporal and spatial correlation function absolute value matrix of the flow layer; and a localization unit for selecting a maximum value $E_{Max}$ in the data temporal and spatial correlation function absolute value matrix, and setting a threshold value $\chi$, wherein $0 < \chi \leq 1$, and for setting those elements in the absolute value matrix with numerical value less than $\chi E_{Max}$ to zero and retaining those elements with numerical value equal to or larger than $\chi E_{Max}$ to obtain the localized temporal and spatial correlation function absolute matrix of the flow layer by operating all the elements;

a parameter module for storing the search range of the unknown parameter ensemble $\vartheta = \{\overline{V}_x, \overline{V}_y, \sigma_{vx}, \sigma_{vy}, \gamma\}$, wherein $\overline{V}_x, \overline{V}_y$ values of relative velocities of flow layer in x, y directions respectively, $\sigma_{vx}, \sigma_{vy}$ are standard deviation of velocities in x, y directions respectively, $\gamma$ is width factor, wherein the initial value of the search range of the unknown parameter ensemble $\vartheta$ stored in the parameter module is a previous measured relative velocity or an average value of multiple previous measured relative velocities;

A fit module for fitting the data matrix derived from the matrix extraction module with a theoretical function in the search range of the unknown parameter ensemble $\vartheta$; wherein the fit module is a calculation module using a sequential quadratic programming method based on the maximum likelihood principle or on the nonlinear least square principle, the theoretical function being $$\varphi(\tau, \vartheta, d) = C\left\{\exp(\gamma\beta_\theta) - \frac{\zeta_2}{2}\left[\frac{\theta_e^2}{2\pi} {}_1F1(2; 1; \beta_\theta) - \cos 2(\alpha_3 - \alpha_2)\frac{B_2^2\theta_e^4}{8\pi^2} {}_1F_1(3; 3; \beta_\theta)\right]\right\}$$

wherein, C is a constant, $\tau$ is delay, d is the distance between receive elements of the sonar array, ${}_1F_1(*)$ is Kummer function, $$\beta_\theta = -\beta_2^2\theta_e/4\pi,$$
$$\beta_2 = \frac{\omega_0}{c}\left((\tau\overline{V}_x + d_x)^2 + (\tau\overline{V}_y + d_y)^2\right)^{1/2}, \xi_2 = \frac{\omega_0\tau}{c}(\sigma_{vx}^2 + \theta_{vy}^2)^{1/2},$$
$$\alpha_2 = tg^{-1}\frac{\tau\overline{V}_y + d_y}{\tau\overline{V}_x + d_x}, \alpha_3 = tg^{-1}\frac{\sigma_{vy}}{\sigma_{yx}}, \theta_e^2 = \frac{1}{2}\frac{\theta_b^2\theta_c^2}{\theta_b^2 + \theta_c^2};$$

wherein $\omega_0$ is the central frequency of the transmit signal, c is the velocity of sound, dx and dy are components of d in x direction and y direction respectively, $\theta_b$ and $\theta_c$ are transmit beam width and receive beam width respectively; and A velocity storage module for storing average values of the relative velocities $\{\overline{V}_x, \overline{V}_y\}$ derived from fitting results of the fit module.

The present invention has the following advantages:

(1) When measuring velocities of flow layer, the theoretical sonar array temporal and spatial correlation function provided by the present invention is applicable not only to far field region, i.e. planar wave region, but also to Fraunhofer region, i.e. spherical wave region. However, the conventional acoustic correlation velocity measuring theory is only applicable to the far field region, so that it is difficult to attain good data in a relative large short-distance scope. The theory of the invention makes the short-distance scope less. Moreover, the fluid medium sonar array temporal and spatial correlation function of the invention is succinctly expressed by Kummer function and in good coincidence with experiments. The conventional theory is expressed in series forms of Bessel function and legendary function, which is inconvenient in use, or is expressed in experiential formulas with no sufficient physical foundation.

(2) The fitting algorithm of the invention uses a sequential quadratic programming method based on the maximum likelihood principle, or on the nonlinear least square principle to fit measured data with the theoretical sonar array temporal and spatial correlation function to attain velocities. Compared with the conventional simplex method, the method of the present invention has faster convergence rate, higher measurement accuracy. Especially, velocity estimation based on nonlinear least square principle, compared with the maximum likelihood principle, has better robustness and small calculation load. In particular to the correlation velocity measuring sonar in actual situation, environmental noises may be uneven in space, the amplitudes and phases of the receive elements of the sonar array may disaccord from each other. They will affect the least square principle less than the maximum likelihood principle.

(3) The present invention uses the method to calculate absolute value of and to localize the data fluid medium temporal and spatial correlation function matrix and uses regions with large amplitudes in the matrix to calculate velocities. The absolute value of the correlation function is only related with the average horizontal velocities $\nabla_x$ and $\nabla_y$, and regions with low signal noise ratio are eliminated. These two signal processing measures raise the measurement accuracy.

(4) The invention uses the average value of measured velocities from the N−m$^{th}$ time to the N$^{th}$ time as the initial value of estimated velocity at the N+1$^{th}$ time, which raises calculation speed and reduces hardware cost.

BRIEF DESCRIPTION OF THE DRAWINGS

FIG. 5 is a diagram of measured velocity comparison between the correlation velocity measuring sonar system (ACCP) and RDI phrased-array acoustic Doppler current profiler (PAADCP) at an area 150 m deep; wherein

Numerals:
Vessel 100 sonar array 200 underwater electronic subsystem 300
Dry end 400 terminal 500

DETAILED DESCRIPTION OF THE PREFERRED EMBODIMENT

The present invention will be described in detail hereinafter in conjunction with the drawings and embodiments.

Figure 1:
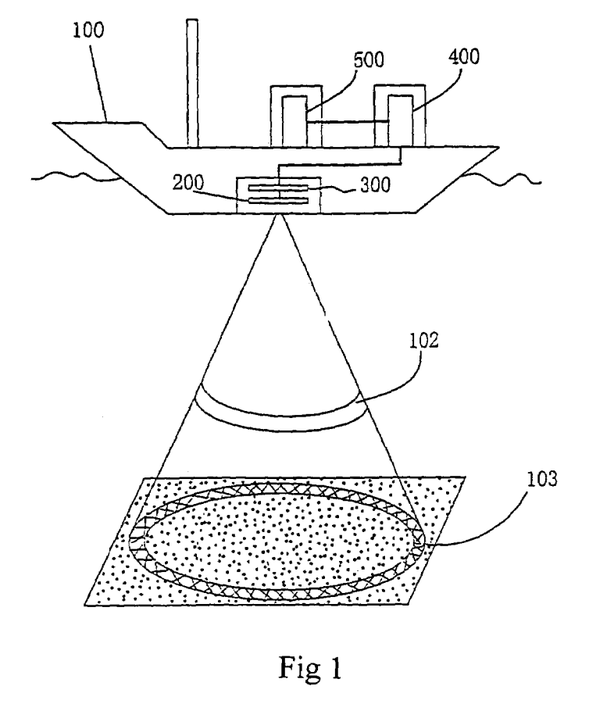
FIG. 1 is a schematic view of a correlation velocity measuring sonar system in operation.

With reference to FIG. 1, a correlation velocity measuring sonar system in accordance with the present invention, used for measuring flow layer velocities, is installed on a vessel (100). The correlation velocity measuring sonar system generally includes a sonar array (200) and an electronic subsystem. The electronic subsystem includes an underwater electronic subsystem (300), a dry end (400) and a terminal (500). The sonar array (200) and underwater electronic subsystem (300) are installed beneath the water, and the dry end (400) and terminal (500) are installed above the water. A transmit transducer array of the sonar array (200) transmits acoustic pulses into the water. The acoustic pulse 102 in one pulse width spreads in the water and encounters the seabed in a ring (103) so as to generate a flow echo and a bottom echo. The echoes are received by the receive transducer array of the sonar array (200), and processed by the electronic subsystem to calculate the velocity of each flow layer.

Figure 2:
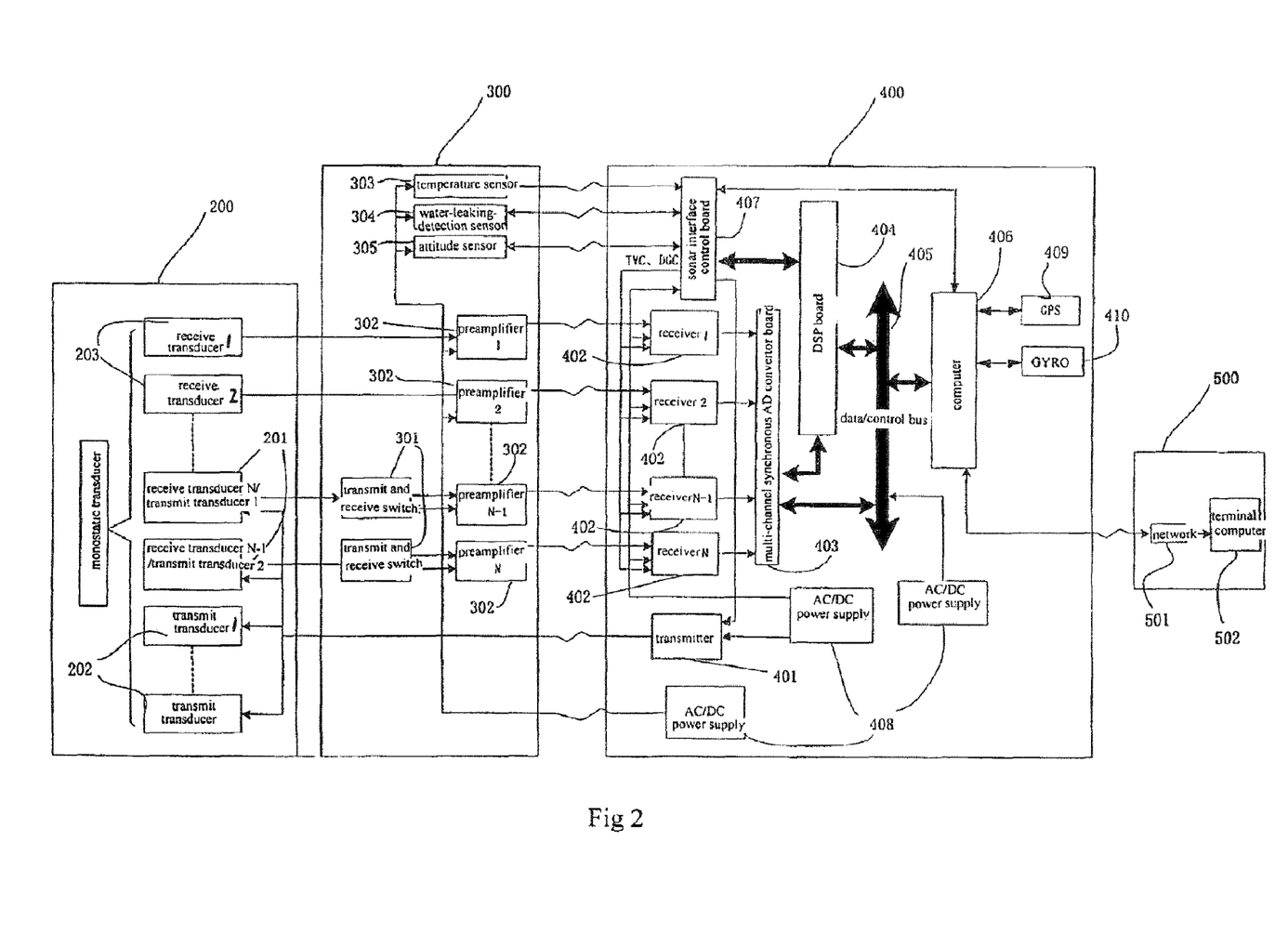
FIG. 2 is a schematic view of the structure of the correlation velocity-measuring sonar system.

The detailed structure of the correlation velocity measuring sonar system composed of the sonar array (200) and electronic subsystem is illustrated in FIG. 2. The sonar array (200) includes receive transducers (203); transmit transducers (202), and homeostatic transducers (201). The receive transducers (203) and the homeostatic transducers (201) constitute the receive sonar array. The transmit transducers (203) and the homeostatic transducers (201) constitute the transmit sonar array.

The underwater electronic subsystem (300) includes multi-channel preamplifiers (302) connected to the receive transducers (203) and the homeostatic transducers (201). Transmit and receive switches (301) are inter-connected with the preamplifiers (302) and the homeostatic transducers (201). The underwater electronic subsystem (300) also includes a temperature sensor (303), a water-leaking-detection sensor (304) and an attitude sensor (305), all connected to a sonar interface control board (407) in the dry end (400).

The dry end (400) includes a transmitter (401) connected to the transmit transducer (202), multi-channel receivers (402) connected to the preamplifiers (302), a multi-channel synchronous AD converter board (403) connected to the multi-channel receivers (402), and a DSP board (404) connected to the multi-channel synchronous AD converter board (403). The dry end (400) also includes a computer (406) connected to the DSP board (404) and multi-channel synchronous AD converter board (403) respectively by a data/control bus (405). The dry end (400) also includes the sonar interface control board (407) connected to the multi-channel receivers (402), the transmitter (401), the DSP board (404) and the computer (406) respectively, and an AC/DC power supply (408) connected to the sonar interface control board (407), the multi-channel receivers (402), the transmitter (401), the data/control bus (405), the temperature sensor (303), the water-leaking-detection sensor (304) and the attitude sensor (305) respectively. The dry end (400) also includes a GPS receiver (409) and a GYRO (410) connected to the computer (406).

The terminal (500) includes a terminal computer (502) connected to the computer (406) by a network (501).

A special velocity measuring program is stored in the computer (406). The program includes an initialization module, signal coding module, transmit/receive module, demodulation and filter module, matrix calculation module, matrix extraction module, parameter module, fit module and velocity storage module. The program is executed according to steps illustrated in FIG. 3.

Figure 3:
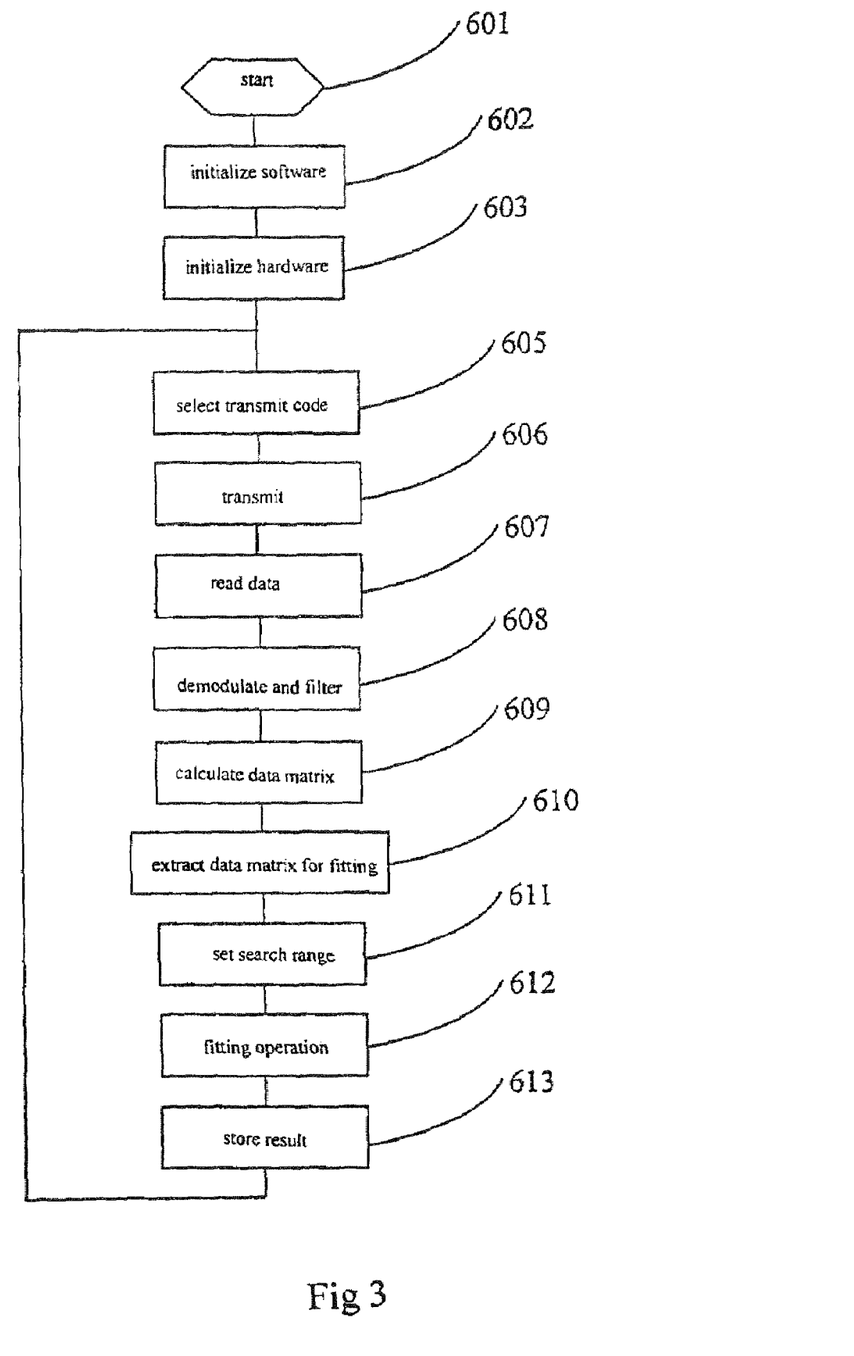
FIG. 3 is a flow chart of the software for the correlation velocity-measuring sonar system.

The step (601) is the start, in which the terminal computer (502) sends instructions to the computer (406) by the network (501), and then the program in the computer (406) starts to enable the sonar system in an operating state. In the steps (602) and (603), the initialization module initializes software and system hardware. In the step (605), according to the layer thickness and the range of the flow velocities, signal coding module selects transmit code, whose autocorrelation has a peak value at a non-zero time delay,. In the step (606), transmit/receive module sends the instructions of the computer (406) through the data/control bus (405) to enable the DSP board (404) to send transmit signals to the transmitter (401), and through the transmit and receiver switches (301) to drive the homeostatic transducers (201) and the transmit transducers (202) to send acoustic pulses into the fluid medium. In the step (607), transmit/receive module controls the receive transducers (203) and homeostatic transducers (201) to receive echoes backscattered by the fluid medium, and to feed the echoes to the multi-channel receivers (402) through the preamplifiers (302) and then to the DSP board (404) through the multi-channel synchronous AD converter board (403). In the step (608), the demodulation module controls the DSP board (404) to demodulate and filter the received echoes.

In the step (609), matrix calculation module calculates data temporal and spatial correlation function matrix of the flow layer according to the demodulated and filtered echo signals.

Figure 4:
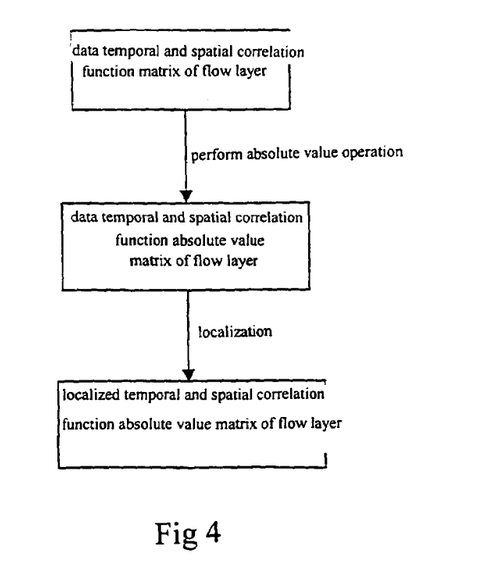
FIG. 4 is a detailed flow chart of the step 609 in FIG. 3.

In the step (610), the matrix extraction module extracts a data matrix for fitting from the data temporal and spatial correlation function matrix of the flow layer. This data matrix will be fitted with a theoretical function provided by the present invention in the step (612). In detail, during the step (610), the matrix extraction module may directly use the data temporal and spatial correlation function matrix derived from the step (609) as the data matrix for fitting, or use the further processed data temporal and spatial correlation function matrix derived from the step (609) as the data matrix for fitting. In the latter, matrix extraction module includes an absolute value calculation unit and a localization unit, for which a detailed flow charts, is illustrated in FIG. 4. With reference to FIG. 4, the absolute value calculation unit performs an absolute value operation on the data temporal and spatial correlation function to attain an absolute value matrix of the data temporal and spatial correlation function. Then, the localization unit performs a localization operation on the absolute value matrix. Finally, the localized matrix is used as the data matrix for fitting. The localization means selecting the maximum value $E_{Max}$ from the data temporal and spatial correlation function absolute value matrix, and setting a threshold value $\chi$, wherein $0<\chi\leq1$. Then, those elements in the absolute value matrix with numerical value less than $\chi E_{Max}$ is set to zero, those elements with numerical value equal to or larger than $\chi E_{Max}$ is retained. The localized temporal and spatial correlation function absolute matrix of the flow layer can be derived by performing the operation on all the elements. The localization operation only chooses the elements larger than or equal to $\chi E_{Max}$, i.e. chooses the region with large signal noise ratio and eliminates the region with low signal noise ratio, thus further simplifying calculation and improving measurement accuracy. In practice, the threshold value $\chi$ is preferred between 0.7 and 1.

After the data matrix for fitting is obtained, the fitting operation of the data matrix and theoretical function matrix is performed to attain velocity of each flow layer relative to the vessel from the fitting results. In accordance with the present invention, a theoretical fluid medium sonar array temporal and spatial correlation function is expressed as follow $$Rs(\tau, \vartheta, d) = \qquad (1)$$

$$C(\exp\{jf(V_z)\})\left\{\exp(\gamma\beta_\theta) - \frac{\zeta_2}{2}\left[\begin{array}{c}\frac{\theta_e^2}{2\pi}{}_1F1(2;1;\beta_\theta) - \\ \cos2(\alpha_3 - \alpha_2)\frac{B_2^2\theta_e^4}{8\pi^2}{}_1F_1(3;3;\beta_\theta)\end{array}\right]\right\}$$

wherein C is a function of $f(V_z)$, $f$ is a certain function, $V_z$ is relative velocity of each flow layer in z direction, $\tau$ is time delay, d is distance between receive elements of the sonar array, ${}_1F_1(*)$ is Kummer function, $$\beta_\theta = -\beta_2^2\theta_e/4\pi,$$
$$\beta_2 = \frac{\omega_0}{c}\left((\tau\bar{V}_x + d_x)^2 + (\tau\bar{V}_y + d_y)^2\right)^{1/2}, \xi_2 = \frac{\omega_0\tau}{c}(\sigma_{vx}^2 + \theta_{vy}^2)^{1/2},$$
$$\alpha_2 = tg^{-1}\frac{\tau\bar{V}_y + d_y}{\tau\bar{V}_x + d_x}, \alpha_3 = tg^{-1}\frac{\sigma_{vy}}{\sigma_{yx}}, \theta_e^2 = \frac{1}{2}\frac{\theta_b^2\theta_c^2}{\theta_b^2 + \theta_c^2};$$

wherein $\omega_0$ is the central frequency of the transmit signal, c is the velocity of sound, $d_x$ and $d_y$ are components of d in x direction and y direction respectively, and $\theta_b$ and $\theta_c$ are transmit beam width and receive beam width respectively.

According to the equation (1), $Rs(\tau, \vartheta, d)$ is related with $\bar{V}_x, \bar{V}_y, \bar{V}_z$. If the three-dimension velocities are all estimated together, the calculation is complex and the accuracy is low. After performing absolute value operation on the theoretical fluid medium sonar array temporal and spatial correlation function expressed in equation (1), an equation is expressed as follow:

$$\varphi(\tau, \vartheta, d) = |R_s(\tau, \vartheta, d)| = \qquad (2)$$

$$C\left\{\exp(\gamma\beta_\theta) - \frac{\zeta_2}{2}\left[\begin{array}{c}\frac{\theta_e^2}{2\pi}{}_1F1(2;1;\beta_\theta) - \\ \cos2(\alpha_3 - \alpha_2)\frac{B_2^2\theta_e^4}{8\pi^2}{}_1F_1(3;3;\beta_\theta)\end{array}\right]\right\}$$

Where C is a constant. A matrix constructed by absolute values of the theoretical temporal and spatial correlation function expressed in the equation (2), is called theoretical temporal and spatial correlation function absolute value matrix, which is relative only with $\bar{V}_x$, and $\bar{V}_y$. This calculation is succinct and the accuracy is high. In practice, $\bar{V}_x, \bar{V}_y$ are often sufficient.

In the step (611), the parameter module sets and stores a search range of the unknown ensemble $\vartheta = \{\bar{V}_x, \bar{V}_y, \sigma_{vx}, \sigma_{vy}, \gamma\}$, wherein the search range of the unknown ensemble $\vartheta$ is set as large as possible at first measurement to include the true velocity of flow layer in the search range. In the following measurements, the previous measurement result or an average value of multiple previous measurement results is preferably used as the initial value for the search range. Therefore, the calculation speed is high, and the hardware cost is low.

In the step (612), the fit module controls the DSP board (404) to fit the data matrix derived from the matrix extraction module during the step (610) with the equation (2) so as to attain the velocity of each flow layer relative to the vessel. Here, the fitting algorithm can be a sequential quadratic programming method based on the maximum likelihood principle, or preferably a sequential quadratic programming method based on the nonlinear least square principle.

In the step (613), the velocity storage module feeds the fitting results derived from the step (613) to the computer (406) through the data/control bus (405) and the computer stores the fitting results in the memory. After the step (613), the program can return back to the step (605) for the next measurement. Absolute velocity of each flow layer can be derived from the average of the velocities of each flow layer relative to the vessel (100) operated in the step (612), cooperated with the velocity of the vessel (100) relative to the bottom. p Finally, data from the temperature sensor (303), the water-leaking-detection sensor (304) and the attitude sensor (305) are fed to the computer (406) by the sonar interface control board (407). The computer (406) also cooperates data from the GPS (409) and GYRO (410) and then sends the final results to the terminal computer (502) by the network (501).

Figure 5A:
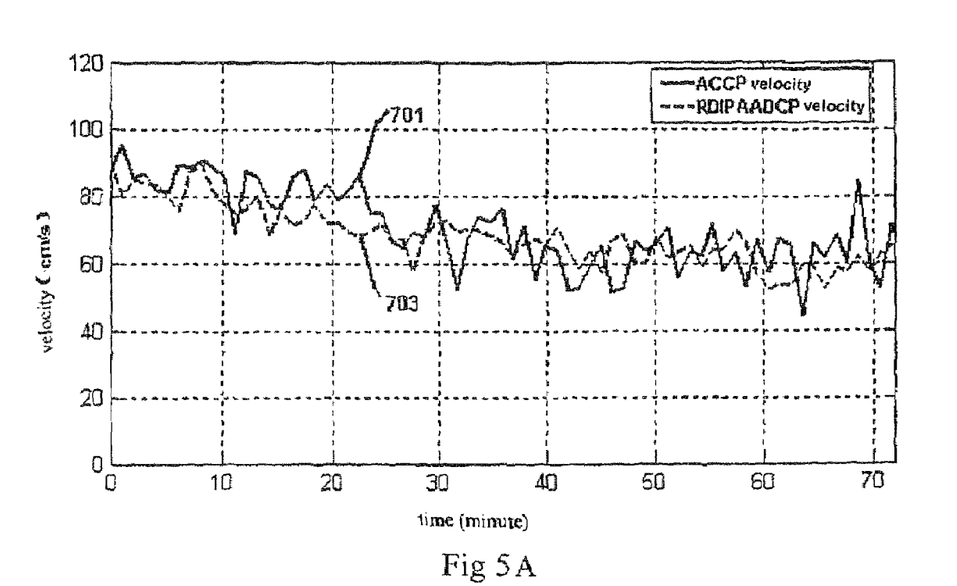
FIG. 5a illustrates measured velocity amplitudes 701 and 703 by these two equipments.
Figure 5B:
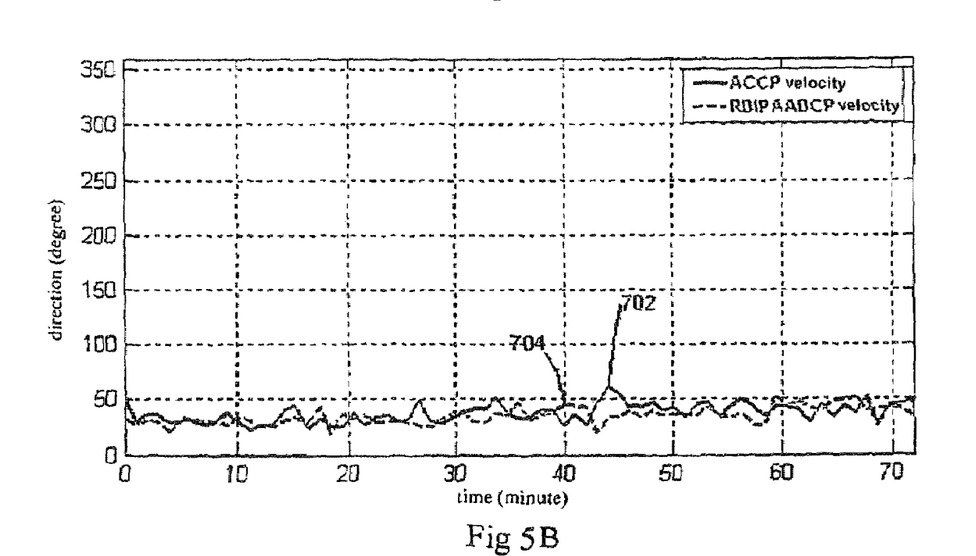
FIG. 5b illustrates measured velocity directions 702 and 704 by these two equipments.

FIG. 5 illustrates diagrams of current velocities in a flow layer 350m underneath the sea surface obtained respectively by the correlation velocity measuring sonar system with 23.5 kHz central frequency, 4.4 kHz bandwidth of the present invention and an acoustic Doppler current profiler (ADCP). FIG. 5a illustrates the amplitudes of flow layer velocities (701, 703) measured by these two equipments in a time interval, wherein the abscissa represents time and the ordinate represents amplitude of velocity. FIG. 5b illustrates directions (702, 704) of flow layer velocities measured by these two equipments in a time interval, wherein the abscissa represents time, and the ordinate represents direction. The results by these two equipments are quite coincided with each other.

The invention claimed is:

1. A method for measuring flow layer velocities using correlation velocity measuring sonar, the method comprising steps of:

(1) selecting a transmit code for acoustic pulses;

(2) according to the transmit code, transmitting the acoustic pulses into a fluid medium, and receiving echo signals backscattered by flow layers in the fluid medium;

(3) demodulating and filtering the echo signals of the flow layers, and calculating a data temporal and spatial correlation function matrix of the flow layers according to the demodulated and filtered echo signals;

(4) extracting a data matrix for fitting from the data temporal and spatial correlation function matrix derived from the step (3), the data matrix for fitting being a localized data temporal and spatial correlation function matrix of the flow layers derived by the steps of:

(a) performing an absolute value operation on the data temporal and spatial correlation function matrix of the flow layers to obtain a data temporal and spatial correlation function absolute value matrix of the flow layers, elements of said data temporal and spatial correlation function absolute value matrix having a maximum value of $E_{Max}$; and (b) setting a threshold value $_\chi$ of $0<_\chi\leq1$, deriving the localized temporal and spatial correlation function absolute matrix by setting those elements in the absolute value matrix with a numerical value less than $_\chi E_{Max}$ to zero, and by retaining those elements in the absolute value matrix with a numerical value equal to or larger than $_\chi E_{Max}$;

(5) setting a search range of an unknown parameter ensemble $\vartheta = \{\bar{V}_x, \bar{V}_y, \sigma_{vx}, \sigma_{vy}, \gamma\}$, wherein $\bar{V}_x$ and $\bar{V}_y$ are average values of relative velocities of the flow layers in x, y directions, respectively, $\sigma_{vx}$ and $\sigma_{vy}$ are standard deviations of the velocities in x, y directions, respectively, and $\gamma$ is a width factor;

(6) using a computer to fit the data matrix for fitting derived from the step (4) into a theoretical fluid medium sonar array function in the search range of the unknown parameter ensemble $\vartheta$ to obtain fitting results, the theoretical fluid medium sonar array function being:

$$\varphi(\tau, \vartheta, d) = C\left\{\exp(\gamma\beta_\theta) - \frac{\zeta_2}{2}\left[\frac{\theta_e^2}{2\pi}{}_1F1(2;1;\beta_\theta) - \cos2(\alpha_3 - \alpha_2)\frac{B_2^2\theta_e^4}{8\pi^2}{}_1F_1(3;3;\beta_\theta)\right]\right\}$$

wherein, C is a constant, $\tau$ is a time delay parameter, d is a distance between receive elements of the sonar array, ${}_1F_1(\cdot)$ is a Kummer function, $$\beta_0 = -\beta_2^2\theta_e/4\pi, \beta_2 = \frac{\omega_0}{c}\left((\tau\bar{V}_x + d_x)^2 + (\tau\bar{V}_y + d_y)^2\right)^{1/2},$$

$$\zeta_2 = \frac{\omega_0\tau}{c}(\sigma_{vx}^2 + \sigma_{wy}^2)^{1/2}, \alpha_2 = tg^{-1}\frac{\tau\bar{V}_y + d_y}{\tau\bar{V}_x + d_x}, \alpha_3 = tg^{-1}\frac{\sigma_{vy}}{\sigma_{vx}},$$

$$\theta_e^2 = \frac{1}{2}\frac{\theta_b^2\theta_c^2}{\theta_b^2 + \theta_c^2},$$

$\omega_0$ is a central frequency of the transmitted acoustic pulses, c is the velocity of sound, dx and dy are components of d in x direction and y direction, respectively, and $\theta_b$ and $\theta_c$ are beam widths of the transmitted acoustic pulses and the received echo signal, respectively; and (7) Obtaining absolute velocities of each of the flow layers by cooperating the velocity of a vessel relative to the seabed with the average values of the relative velocities $\{\bar{V}_x, \bar{V}_y\}$ derived according to the fitting results obtained in the step (6).

2. The method for measuring flow layer velocities using correlation velocity measuring sonar as claimed in claim 1, characterized in that the steps (1)~(7) are repeated for the next velocity measurement of flow layer.

3. The method for measuring flow layer velocities using correlation velocity measuring sonar as claimed in claim 2, characterized in that a value selected from among a previous measured relative velocity and an average value of multiple previous measured relative velocities is used as the initial value of the search range of the unknown parameter ensemble $\vartheta$.

4. The method for measuring flow layer velocities using correlation velocity measuring sonar as claimed in claim 1, characterized in that the autocorrelation of the transmit code in the step (1) has a peak value at a non-zero time delay.

5. The method for measuring flow layer velocities using correlation velocity measuring sonar as claimed in claim 1, characterized in that the threshold value $_\chi$ is $0.7 <_\chi\leq1$.

6. The method for measuring flow layer velocities using correlation velocity measuring sonar as claimed in claim 1, characterized in that, a fitting algorithm set forth by step (6) uses a sequential quadratic programming method based on a maximum likelihood principle.

7. The method for measuring flow layer velocities using correlation velocity measuring sonar as claimed in claim 1, characterized in that, a fitting algorithm set forth by step (6) uses a sequential quadratic programming method based on a nonlinear least square principle.

8. A correlation velocity measuring sonar system including a sonar array and an electronic subsystem, the electronic subsystem having a computer, characterized in that the computer comprises:

an initialization module for initializing software and hardware;

a signal coding module for selecting transmit codes for acoustic pulses;

a transmit/receive module for transmitting acoustic pulses into a fluid medium, and receiving echo signals backscattered by flow layers in the fluid medium;

a demodulation and filter module for demodulating and filtering the echo signals of the flow layers received by the transmit/receive module;

a matrix calculation module for calculating a data temporal and spatial correlation function matrix of the flow layers according to the demodulated and filtered echo signals of the flow layers;

a matrix extraction module for extracting a data matrix for fitting from the data temporal and spatial correlation function matrix of the flow layers derived by the matrix calculating module;

a parameter module for storing a search range of an unknown parameter ensemble $\vartheta = \{\bar{V}_x, \bar{V}_y, \sigma_{vx}, \sigma_{vy}, \gamma\}$, wherein $\bar{V}_x$ and $\bar{V}_y$ are average values of relative velocities of the flow layers in x, y directions respectively, $\sigma_{vx}$ and $\sigma_{vy}$ are standard deviations of the velocities in x, y directions respectively, and $\gamma$ is a width factor;

a fit module on a computer for fitting the data matrix derived by the matrix extraction module into a theoretical fluid medium sonar array function in the search range of the unknown parameter ensemble $\vartheta$ to obtain fitting results, the theoretical fluid medium sonar array function being:

$$\varphi(\tau, \vartheta, d) = C \left\{ \exp(\gamma \beta_\theta) - \frac{\zeta_2}{2} \left[ \frac{\theta_e^2}{2\pi} {}_1F1(2; 1; \beta_\theta) - \cos 2(\alpha_3 - \alpha_2) \frac{B_2^2 \theta_e^4}{8\pi^2} {}_1F_1(3; 3; \beta_\theta) \right] \right\}$$

wherein, C is a constant, $\tau$ is a time delay parameter, d is the distance between receive elements of the sonar array, $_1F_1(*)$ is a Kummer function, $$\beta_\theta = -\beta_2^2 \theta_e / 4\pi,$$
$$\beta_2 = \frac{\omega_0}{c}\left((\tau \overline{V}_x + d_x)^2 + (\tau \overline{V}_y + d_y)^2\right)^{1/2}, \xi_2 = \frac{\omega_0 \tau}{c}(\sigma_{vx}^2 + \theta_{vy}^2)^{1/2},$$
$$\alpha_2 = tg^{-1}\frac{\tau \overline{V}_y + d_y}{\tau \overline{V}_x + d_x}, \alpha_3 = tg^{-1}\frac{\sigma_{vy}}{\sigma_{yx}}, \theta_e^2 = \frac{1}{2}\frac{\theta_b^2 \theta_c^2}{\theta_b^2 + \theta_c^2};$$

$\omega_0$ is the central frequency of the transmitted acoustic pulses, c is the velocity of sound, $d_x$ and $d_y$ are components of d in x direction and y direction respectively, and $\theta_b$ and $\theta_c$ are transmit beam width and receive beam width respectively; and a velocity storage module for storing average values $\{\nabla_x, \nabla_y\}$ of the relative velocities derived according to the fitting results obtained by the fit module, the data matrix for fitting extracted by the matrix extraction module being a localized data temporal and spatial correlation function absolute value matrix of the flow layers, and the matrix extraction module comprises:

an absolute value calculation unit for performing an absolute value operation on the data temporal and spatial correlation function matrix to attain a data temporal and spatial correlation function absolute value matrix of the flow layers; and a localization unit for selecting a maximum value $E_{Max}$ in the data temporal and spatial correlation function absolute value matrix of the flow layers, and for to obtaining the localized temporal and spatial correlation function absolute matrix of the flow layers by setting a threshold value $_\chi$ of $0<_\chi \leq 1$, by setting those elements in the absolute value matrix with a numerical value less than $_\chi E_{Max}$ to zero, and by retaining those elements in the absolute value matrix with a numerical value equal to or larger than $_\chi E_{Max}$.

9. The correlation velocity measuring sonar system as claimed in claim 8, characterized in that the transmit code generated by the signal coding module has a correlation peak value at a non-zero time delay.

10. The correlation velocity measuring sonar system as claimed in claim 8, characterized in that the fit module is a calculation module using a sequential quadratic programming method based on a maximum likelihood principle for the fitting operation.

11. The correlation velocity measuring sonar system as claimed in claim 8, characterized in that the fit module is a calculation module using a sequential quadratic programming method based on a nonlinear least square principle for the fitting operation.

12. The correlation velocity measuring sonar system as claimed in claim 8, characterized in that an initial value of the search range of the unknown parameter ensemble $\vartheta$ stored in the parameter module is a previous measured relative velocity or an average value of multiple previous measured relative velocities.

* * * * *